(12) United States Patent
Bonacini

(10) Patent No.: US 7,500,504 B2
(45) Date of Patent: Mar. 10, 2009

(54) BEAD BREAKING UNIT FOR TIRE CHANGING MACHINES

(75) Inventor: Maurizio Bonacini, Correggio (IT)

(73) Assignee: Giuliano S.p.A., Correggio (IT)

( * ) Notice: Subject to any disclaimer, the term of this patent is extended or adjusted under 35 U.S.C. 154(b) by 0 days.

(21) Appl. No.: 11/892,875

(22) Filed: Aug. 28, 2007

(65) Prior Publication Data

US 2008/0060762 A1 Mar. 13, 2008

(30) Foreign Application Priority Data

Sep. 8, 2006 (IT) .......................... MO2006A0274

(51) Int. Cl.
*B60C 25/135* (2006.01)
(52) U.S. Cl. .................................... 157/1.17
(58) Field of Classification Search ................. 157/1.17, 157/1.28, 11
See application file for complete search history.

(56) References Cited

U.S. PATENT DOCUMENTS 4,804,030 A * 2/1989 Mandelko .................. 157/1.17
5,226,465 A * 7/1993 Schon et al. ................ 157/1.28
6,276,423 B1 * 8/2001 Goracy ....................... 157/1.17
7,341,090 B2 * 3/2008 Gonzaga .................... 157/1.17

* cited by examiner

*Primary Examiner*—David B Thomas
(74) *Attorney, Agent, or Firm*—Dykema Gossett PLLC

(57) ABSTRACT

A bead breaking unit includes an arm which is attachable to the base of a tire changing machine and has a first end for attachment of a bead breaking tool and a second end opposite the first. The first end is mobile between an idle position, in which the bead breaking tool is placed away from the base, and a working position, in which the bead breaking tool is placed in contact with a wheel to bead break, positioned in proximity to the base. The bead breaking unit also includes an adjustment device for adjusting the trajectory of the bead breaking tool when moving between the idle position and the working position, which are interposed between the base and the arm and suitable for defining a first operating configuration in which the trajectory is curvilinear and a second operating configuration in which the trajectory is rectilinear.

9 Claims, 3 Drawing Sheets

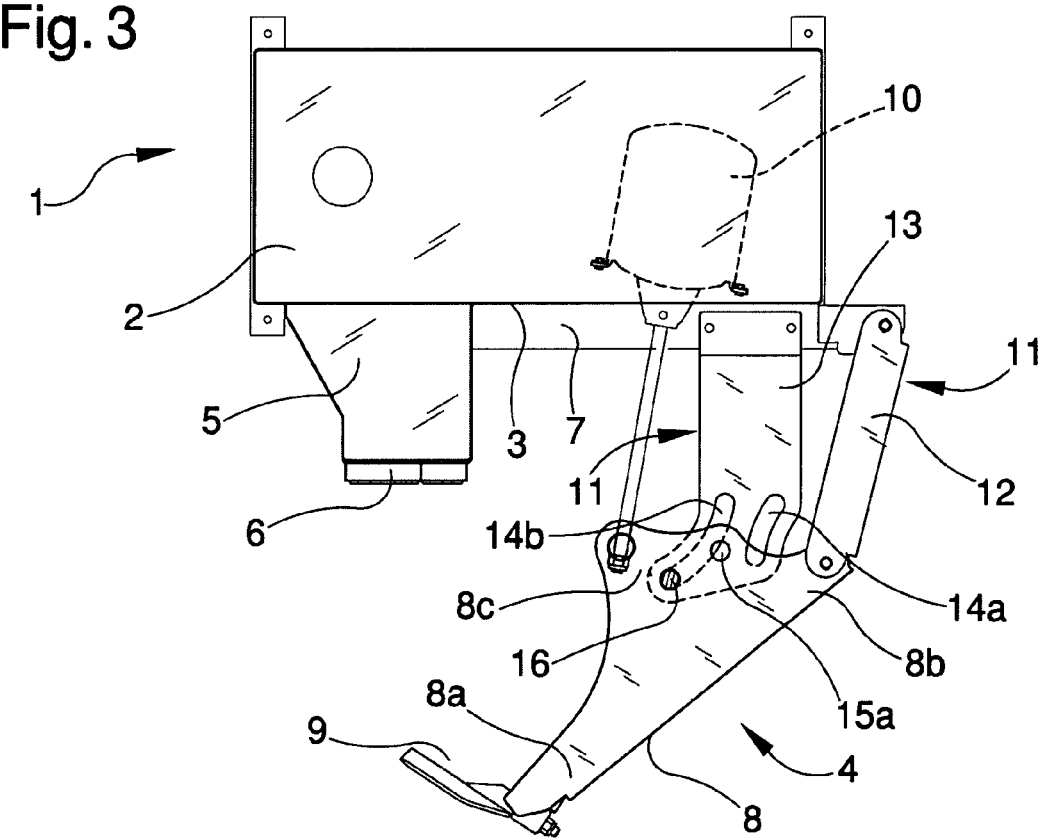
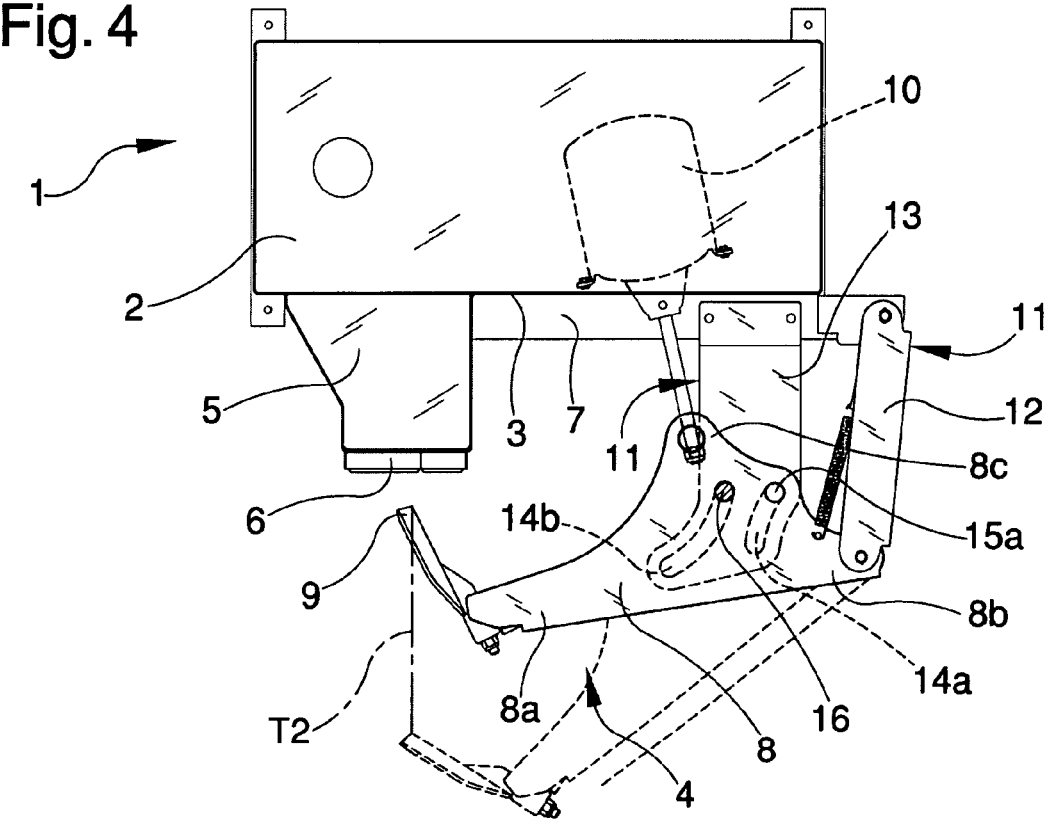

BEAD BREAKING UNIT FOR TIRE CHANGING MACHINES

FIELD OF THE INVENTION

The present invention refers to a bead breaking unit for tire changing machines. As is common knowledge, the tire changing machines are normally used to fit/remove tires in/off their seat obtained on the rims.

BACKGROUND OF THE INVENTION

Before a tire can be removed completely from its rim it is necessary to detach the beads from their bead clipping edges present on the rim.

This operation is done by means of a suitable bead breaking unit, normally present on the tire changing machine. The traditional bead breaking units comprise an arm having a first end hinged to the supporting base and a second end associated to a bead breaking tool, otherwise called small shovel.

An automatic linear actuator is placed in between the arm and the base of the machine that allows the arm to rotate and, in particular, its oscillation between a working position, wherein the bead breaking tool is in proximity of the machine and in contact with the wheel to bead break, and an idle position, wherein the bead breaking tool is kept away from the base.

The known bead breaking units do have some drawbacks however, in particular due to the disparity of the sizes, shapes and stiffness characteristics of the tires that are available on the market. The variation of these parameters unavoidably influences the good outcome of the bead breaking operation, sometimes making it more difficult, laborious and even risky for the safety of the wheel itself However, the known bead breaking units are susceptible to additional upgrading.

The need is highly felt in this sector to avoid such a technical problem by using a bead breaking unit with mechanical characteristics that make it suitable for bead breaking different types of tire.

OBJECT OF THE INVENTION

The main aim of the present invention is to provide a bead breaking unit for tire changing machines which allows to work on a wide range of wheels for motor vehicles, hence able to adapt to the different technical and morphological characteristics of tires and rims.

Within the scope of such technical aim, another object of the present invention is to cater for the above aims with a simple structure, of relatively practical implementation, safe to use and with effective operation, as well as having a relatively low cost.

All the objects mentioned above are achieved by the present bead breaking unit for tire changing machines, comprising an arm associable to the base of a tire changing machine and having a first end which is associated to a bead breaking tool and a second end opposite the first, the first end being mobile between an idle position, in which the bead breaking tool is placed away from the base, and a working position, in which the bead breaking tool is placed in contact with a wheel to bead break, positioned in proximity of the base, wherein it comprises an adjustment device for adjusting the trajectory of the bead breaking tool when moving between the idle position and the working position, which are interposed between the base and the arm and suitable for defining at least one first operating configuration in which the trajectory is substantially curvilinear and at least a second operating configuration in which the trajectory is substantially rectilinear.

BRIEF DESCRIPTION OF THE DRAWINGS

Further characteristics and advantages of the present invention will appear even more evident from the detailed description of a preferred, but not exclusive, embodiment of a bead breaking unit for tire changing machines, illustrated indicatively by way of non limiting example, in the attached drawings wherein:

the FIG. 1 is a plan view, schematic and partial, of a tire changing machine on which the bead breaking unit according to the invention is mounted, arranged in the first operating configuration and with the bead breaking tool in the idle position;

Figure 2:
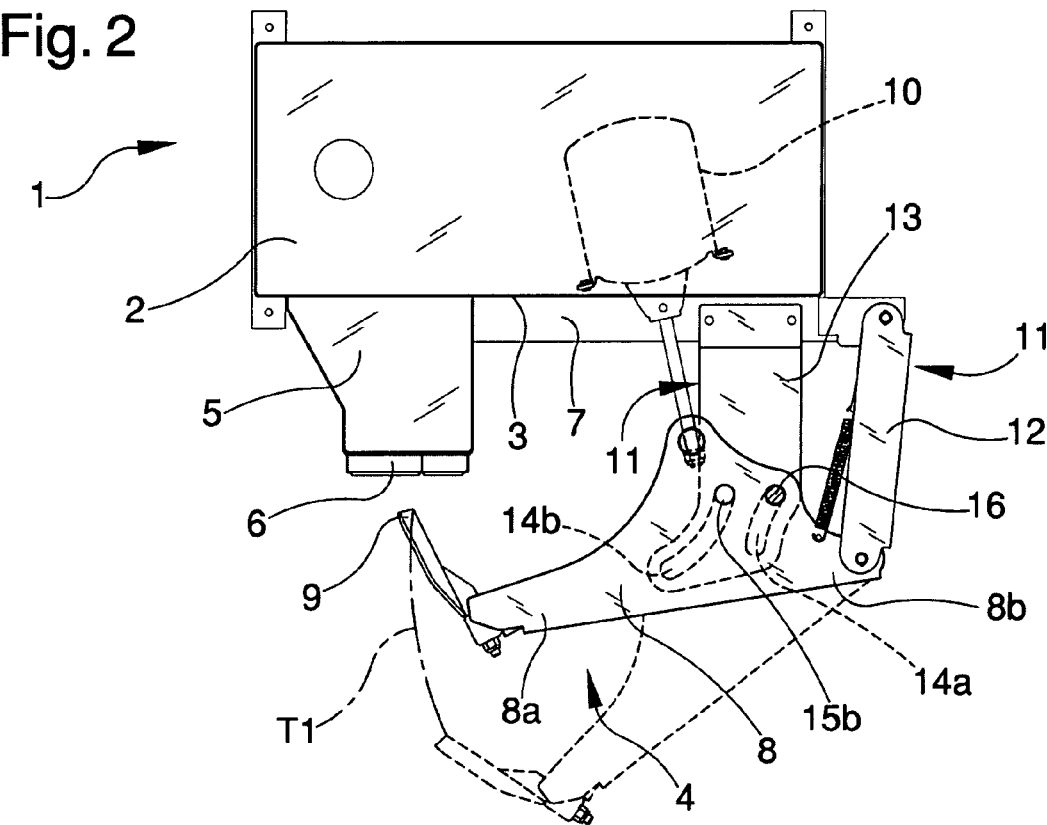
Figure 5:
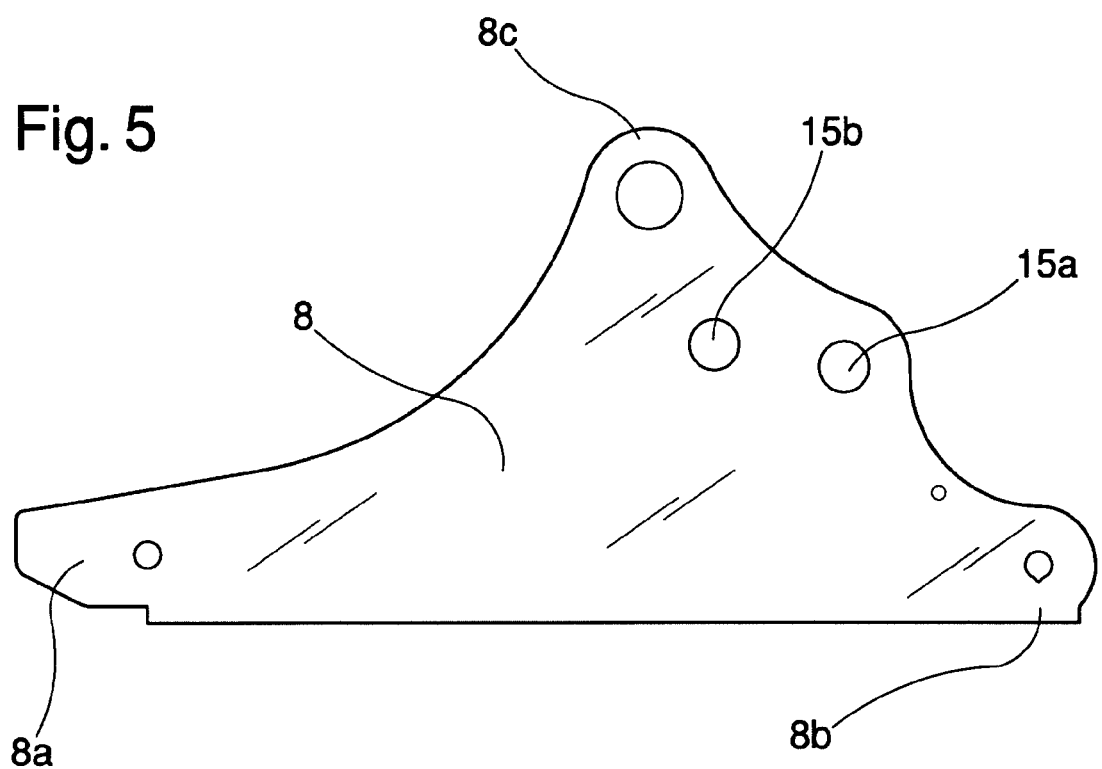
Figure 6:
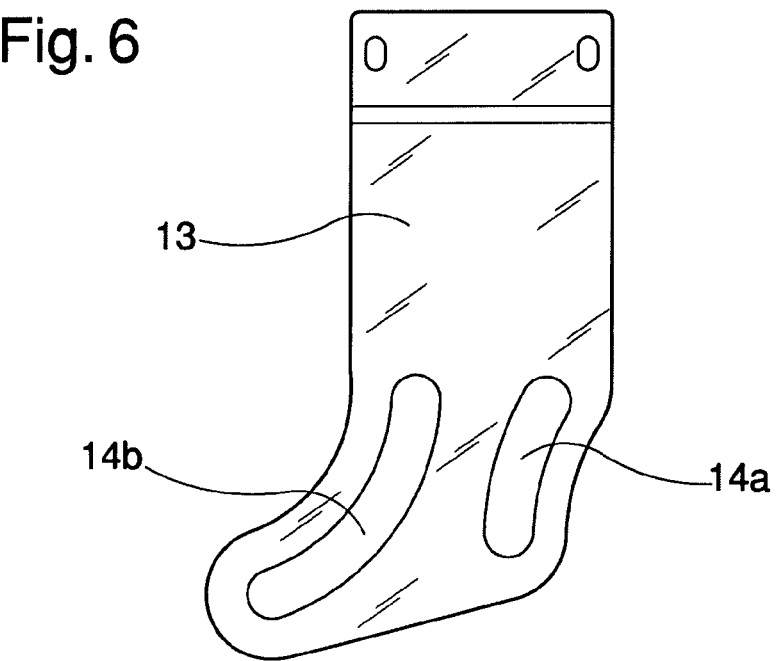

the FIG. 2 is a plan view, schematic and partial, of a tire changing machine on which the bead breaking unit according to the invention is mounted, arranged in the first operating configuration and with the bead breaking tool in the working position;

the FIG. 3 is a plan view, schematic and partial, of a tire changing machine on which the bead breaking unit according to the invention is mounted, arranged in the second operating configuration and with the bead breaking tool in the idle position;

the FIG. 4 is a plan view, schematic and partial, of a tire changing machine on which the bead breaking unit according to the invention is mounted, arranged in the second operating configuration and with the bead breaking tool in the working position;

the FIG. 5 is a plan view and on an enlarged scale of the arm of the bead breaking unit according to the invention;

the FIG. 6 is a plan view and on an enlarged scale of the guide element of the bead breaking unit according to the invention.

DETAILED DESCRIPTION OF THE PREFERRED EMBODIMENT(S)

With particular reference to such figures, a tire changing machine has been globally indicated by 1.

The machine 1 has a supporting base 2 which on one lateral side 3 houses a bead breaking unit 4 to bead break the tire of a wheel from its rim.

To the lateral side 3 is also associated a foot 5, which has a front pad 6 on which to rest the wheel to bead break, as well as a substantially horizontal longitudinal rib 7.

The bead breaking unit 4 has an arm 8 that has a first end 8a connected to a bead breaking tool 9 and a second end 8b opposite the first.

Between the base 2 and the arm 8 a pneumatic cylinder 10 is interposed with its corresponding ends hinged to the rib 7 and to the median portion 8c of the arm 8 respectively.

The operation of the pneumatic cylinder 10 moves the arm 4 causing the bead breaking tool 9 to move away or close to the wheel.

Figure 1:
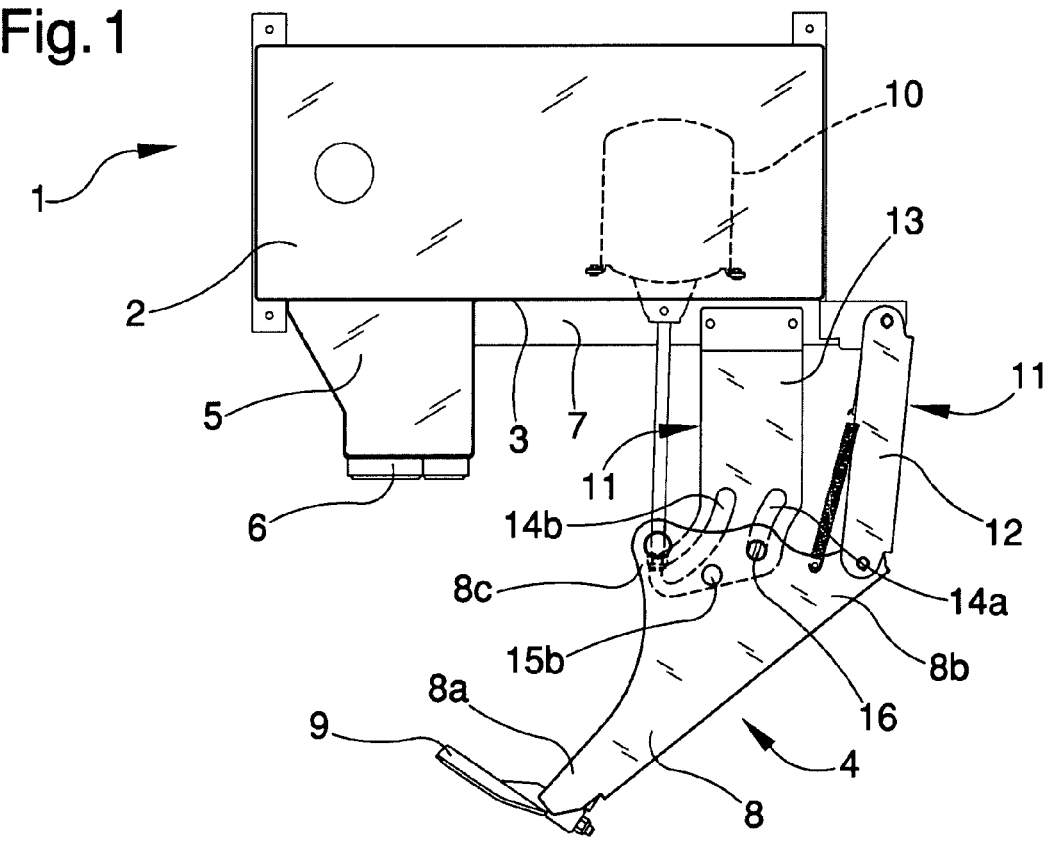

In particular, the cylinder 10 allows the bead breaking tool 9 to go from an idle position (FIGS. 1 and 3), where the bead breaking tool 9 is substantially distanced from the base 2, to a working position (FIGS. 2 and 4) where the bead breaking tool 9 is arranged in proximity of the base and comes into contact with the side of the tire on which the bead breaking is to be executed.

Advantageously, the bead breaking unit 4 comprises an adjustment device 11 for adjusting the trajectory of the bead breaking tool 9 during the movement between the idle position and the working position.

Such adjustment device 11 are interposed between the base 2 and the arm 8 and are suitable for defining a first operating configuration (FIGS. 1 and 2), wherein the trajectory T, of the bead breaking tool 9 is substantially curvilinear, and a second operating configuration (FIGS. 3 and 4), wherein the trajectory $T_2$ of the bead breaking tool 9 is substantially rectilinear and at right angles to the side 3 of the base 2.

The adjustment device 11, in effect, allow to adjust the way the bead breaking tool 9 moves close to the wheel and make it possible to choose the best approach for the type of tire to bead break, in particular modifying the trajectory of the active part of the bead breaking tool 9, i.e., the part that comes into contact with the wheel, during the passage from the idle position to the working position.

In detail, the adjustment device 11 comprise a connecting rod 12 which has an extremal section hinged to the rib 7 and the opposite extremal section hinged to the arm 8.

Both the hinged points of the connecting rod 11 are turnable around respective substantially vertical axes.

In addition, the adjustment device 11 include a guide element 13 that extends from the lateral side 3 and is placed between the base 2 and the arm 8.

On the guide element 13 there are guide means for the arm 8 which, for example, are made up of a first through slot 14*a* and a second through slot 14*b* obtained on the distal part of the guide element 13 and are alternatively engageable by the median portion 8*c* of the arm 8.

The first slot 14*a* is shaped like a circumference arc which, in the first operating configuration, has its centre in the hinged point of the connecting rod 12 with the second end 8*b* of the arm 8.

Instead the second slot 14*b* is curvilinear in shape with its concavity opposite with respect to the first slot 14*a*.

The median portion 8*c* of the arm 8 is arranged in proximity of the distal part of the guide element 13 and at least in part overlaps it.

In addition, on the median portion 8*c* a first and a second through hole 15*a* and 15*b* are obtained intended to be coupled to the first and second slot 14*a* and 14*b* respectively by means of a pin 16.

In fact, in the first operating configuration the pin 16 is inserted precisely in the first hole 15*a* and in a sliding way along the first slot 14*a*, univocally determining the relative movement of the arm 8 in relation to the base 2.

Due to the particular shape of the first slot 14*a*, in detail, in the first operating configuration the connecting rod 12 remains still while the arm 8 and the bead breaking tool 9 delineate the circular trajectory T, around the hinged point of the connecting rod 12 with the second end 8*b* of the arm 8.

In the second operating configuration, however, the pin 16 is inserted precisely inside the second hole 15*b* and in a sliding way along the second slot 14*b*.

During the movement from the idle position to the working position, the particular curvilinear shape of the second slot 1 5*b* guides the arm 8 in a rotating-translating movement wherein the first end 8*a* moves close to the wheel to bead break along the rectilinear trajectory $T_2$ while the connecting rod 12 delineates a small rotation around the hinged point with the rib 7.

It was in fact seen how the invention described achived the proposed objects and, in particular, the fact is underlined that it is able to work with two different operating configurations which make it possible to diversify the moving-near approach of the bead breaking tool to the wheel, achieving greater flexibility of use and the possibility of working on different types of tire.

The invention thus conceived is susceptible of numerous modifications and variations, all of which falling within the scope of the inventive concept.

Furthermore all the details may be replaced by other elements which are technically equivalent.

In practice, the materials used, as well as the contingent shapes and dimensions, may be any according to requirements without because of this moving outside the protection scope of the following claims.

The invention claimed is:

1. A bead breaking unit for a tire changing machine, comprising
    an arm having a first end to which a bead breaking tool can be attached and a second end opposite the first, said first end being mobile between an idle position in which said bead breaking tool is placed away from a base of a tire changing machine, and a working position in which said bead breaking tool is placed in contact with a wheel to bead break; and
    an adjustment device for adjusting a trajectory of said bead breaking tool when the arm moves between said idle position and said working position, which are interposed between a base and said arm and suitable for defining at least one first operating configuration in which said trajectory is substantially curvilinear and at least a second operating configuration in which said trajectory is substantially rectilinear, wherein said adjustment device comprises at least one guide element positioned between said arm and said base, and said guide means comprising at least a first and a second slot formed in said guide element which are alternatively engageable by said portion of the arm.

2. The bead breaking unit according to claim 1, wherein said adjustment device is attachable to a lateral side of said base.

3. The bead breaking unit according to claim 1, wherein said adjustment device comprise a connecting rod which has a section which can be hinged to said base and a section hinged to said arm.

4. The bead breaking unit according to claim 3, wherein said arm is hinged to said connecting rod at said second end.

5. The bead breaking unit according to claim 1, wherein said portion is substantially median.

6. The bead breaking unit according to claim 1, wherein said adjustment device comprises a connecting rod which has a section that can be hinged to said base and a section hinged to said arm, and said first slot is shaped like a circumferential arc which, in said first operating configuration, has its center in the hinged point of said arm with said connecting rod.

7. The bead breaking unit according to claim 6, wherein said second slot is curvilinear in shape with its concavity opposite said first slot.

8. The bead breaking unit according to claim 1, wherein said adjustment device comprises at least a through hole in said portion of the arm and at least one pin which can be inserted in said hole and alternatively in one of said slots.

9. The bead breaking unit according to claim 8, wherein said adjustment device comprise two of said holes, one for each of said slots.

* * * * *